United States Patent [19]
Meyer

[11] 3,775,927
[45] Dec. 4, 1973

[54] SELF-RETAINING FASTENER
[75] Inventor: Engelbert A. Meyer, Union Lake, Mich.
[73] Assignee: Warren Fastener Corporation, Mt. Clemens, Mich.
[22] Filed: May 26, 1972
[21] Appl. No.: 257,416

[52] U.S. Cl. .................................. 52/718, 85/5 R
[51] Int. Cl. .............................. E04f 19/02
[58] Field of Search .................. 52/718; 24/73 FT, 24/73 PM, 73 PF, 73 HS; 85/DIG. 2, 5 R

[56] References Cited
UNITED STATES PATENTS

| | | | |
|---|---|---|---|
| 2,424,757 | 7/1947 | Klumpp | 85/80 |
| 2,685,721 | 8/1954 | Eves | 24/73 MF |
| 3,393,431 | 7/1968 | Saunders | 24/73 PF |
| 3,412,437 | 11/1968 | Bennett | 24/73 PF |

Primary Examiner—John E. Murtagh
Attorney—Carl E. Johnson et al.

[57] ABSTRACT

A plastic one-piece fastener having a base, a body symmetrically tapering in one plane normal thereto, and a pointed end portion is transversely receivable in a decorative molding or other article to be mounted. A pair of lateral resilient retainer wings of the body is deflectible together on entering an aperture of a mounting member, the wing portions having locking shoulders projecting in angular relation to the base for retaining the article in relation to the base. The locking shoulders may be formed with work retaining teeth.

7 Claims, 11 Drawing Figures

PATENTED DEC 4 1973

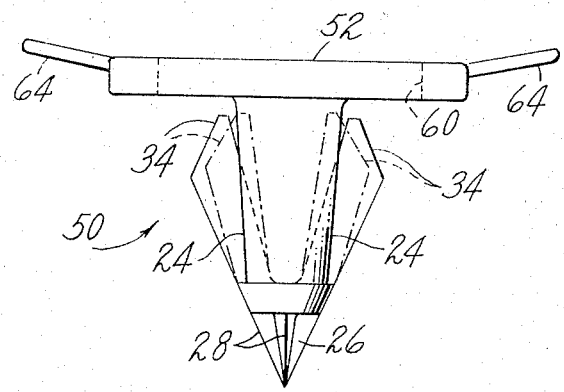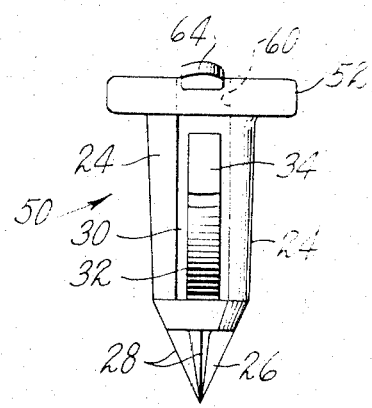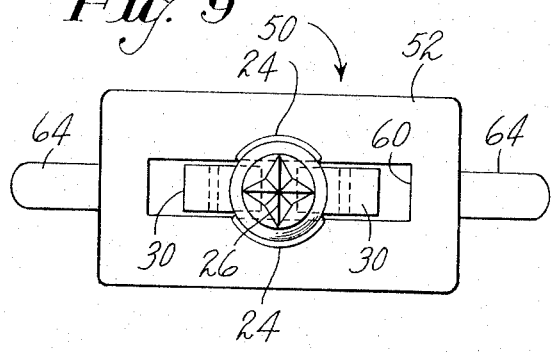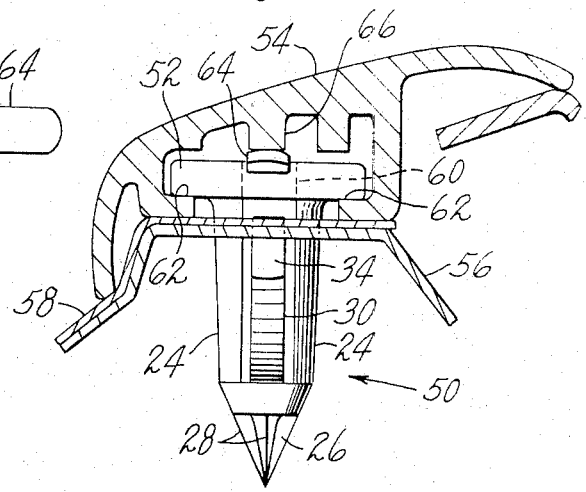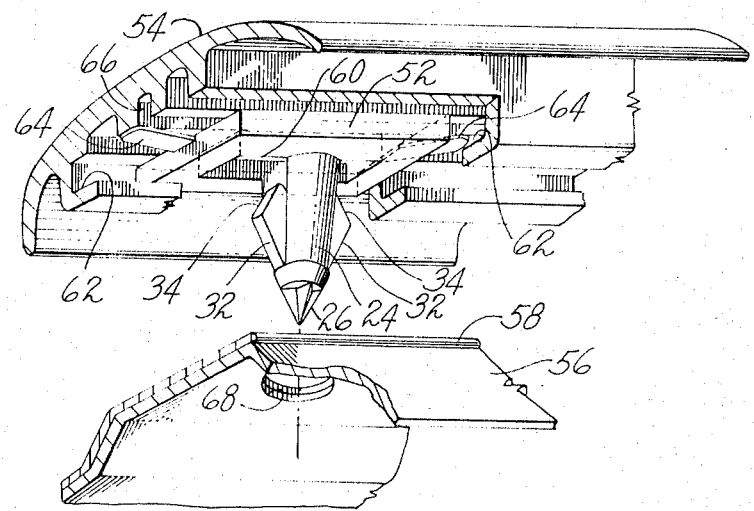

1

SELF-RETAINING FASTENER

BACKGROUND OF THE INVENTION

This invention relates to clasps, and more especially to one-piece plastic clips of the type having collapsible side portions to provide locking retention when axially thrust into a structure.

As herein shown a molded fastener embodying the invention comprises a base portion, and a partly split stem portion projecting normal thereto, the stem portion integrally having side portions resiliently collapsible in the stem when a pointed end thereof is thrust through a mounting structure which may or may not be prepunctured.

Push-in headed fasteners of integral type have hitherto been provided, and while they are considered generally to have operated satisfactorily, they have not always been easily insertable or entirely reliable for holding certain items in assembled relation, especially when the items may at times vary dimensionally.

SUMMARY OF THE INVENTION

It accordingly is an object of this invention to provide an improved one-piece fastener of simple construction and low cost which, upon being thrust endwise through one or more work pieces, will reliably retain them in assembled relation.

Another object of the invention is to provide a laterally collapsible fastener clip having resilient appendages whereby sheet material may conveniently be clamped as by an ornamental molding strip to a supporting member.

A further object of the invention is to provide a clip for attaching a trim strip such as a molding in clamping relation to a backing member To these ends a feature of the invention resides in provision of a plastic one-piece fastener having an anchoring base portion, a partly forked, semi-cylindrical tapering stem extending therefrom and terminating in a piercing point, opposite side wings of the stem extending toward the base from said point and being resiliently deflectible toward the stem axis, the portions of the wings nearer the base respectively extending angularly toward said axis to lock a work piece on the stem and against the base portion.

It will be understood that while the invention is expected to enjoy a market in the automotive field, especially as regards securement of interior trim, application of the invention in its different embodiments is not thus limited.

BRIEF DESCRIPTION OF THE DRAWINGS

The foregoing and other features of the invention will now be more particularly described in connection with two illustrative embodiments, and with reference to the accompanying drawings thereof, in which:

FIG. 7 is a view in side elevation of an alternative form of the clip shown in FIGS. 1-6;

FIG. 8 is a view in end elevation of the clip shown in FIG. 7;

FIG. 9 is a bottom view of the clip of FIGS. 7 and 8;

FIG. 10 is a transverse section illustrating the clip of FIGS. 7—9 in securing (interior automobile window trim) parts in yieldable clamping relation, and FIG. 11 is a perspective view of the parts of FIG. 10 prior to their assembly.

DESCRIPTION OF PREFERRED EMBODIMENTS

Figure 1:
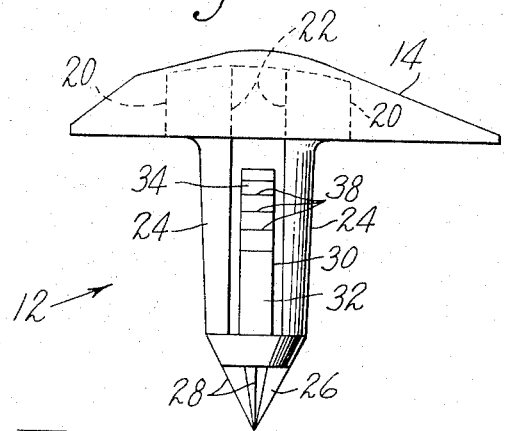
FIG. 1 is a view in end elevation of a one-piece plastic clip as adapted for retaining one or more work pieces in assembled relation.
Figure 2:
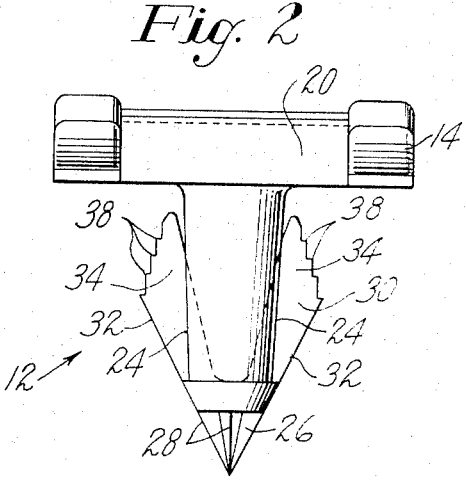
FIG. 2 is a view in side elevation of the clip shown in FIG. 1.
Figure 3:
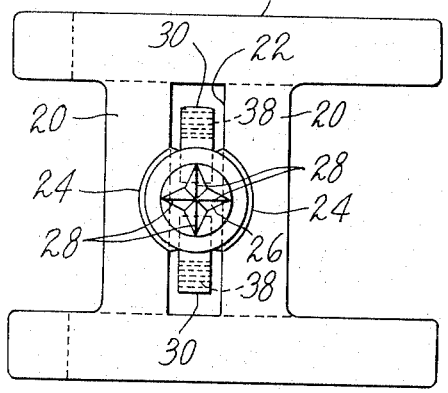
FIG. 3 is a bottom view of the clip shown in FIGS. 1 and 2.
Figure 4:
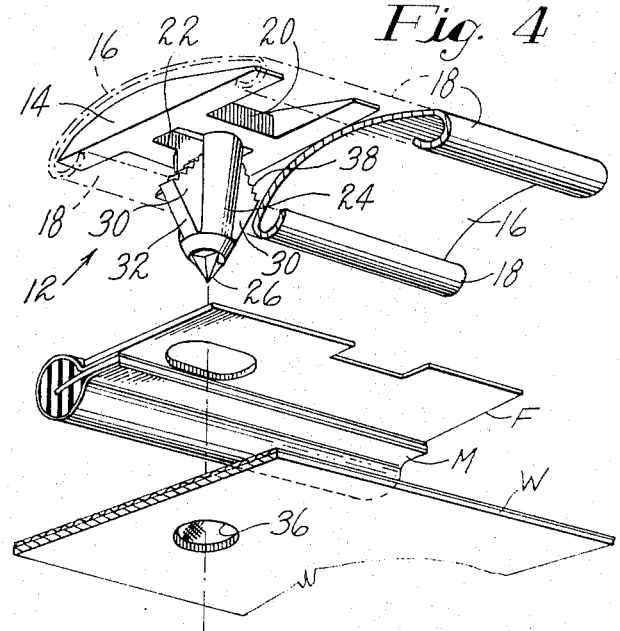
FIG. 4 is an exploded perspective view of the clip and a molding to be assembled on a backing plate in clamping relation to a welt strip.

Referring to FIGS. 1-3 inclusive, a one-piece fastener clip preferably of molded plastic is generally designated 12. It comprises an H-shaped base 14 the legs of which in this instance are contoured to fit within a molding strip 16 (FIGS. 4 and 5) and slidably bridge inwardly rounded marginal portions 18 of the strip 16. The cross bar portion of the H-shaped base 14 is formed with spaced portions 20,20 provided by an aperture 22 into which a molding core has initially been inserted. Centrally upstanding from the base portions 20, respectively, are complemental, partly cylindrical, parallel stem portions 24,24 which merge at their extremity in a solid pointed, work penetrating portion 26. This portion 26 preferably has its piercing tip comprised of sharp, concentrically merging ridges 28 for aiding guidance during installation and for facilitating puncture of soft sheet material (such as cloth or vinyl trim) when not prepunctured. The pointed end 26 is specifically designed to be used for applications employing soft, non-perforated trim material which is to cover up a preformed mounting hole in a stiffer attaching member such as a roof rail, for instance.

Figure 5:
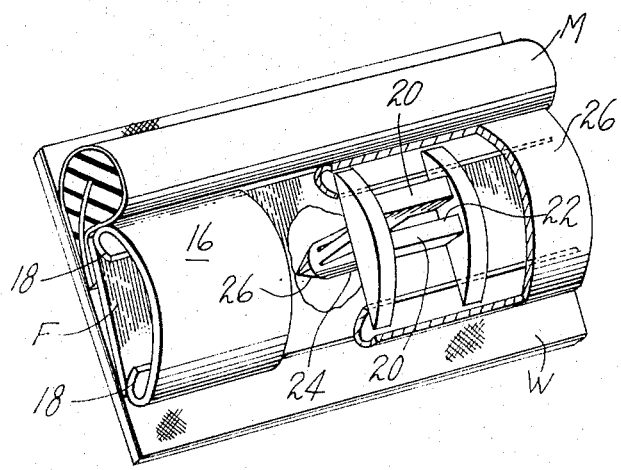
FIG. 5 is a perspective view, with a portion broken away, showing the parts of FIG. 4 as assembled by the clip of FIGS. 1-3 inclusive.
Figure 6:
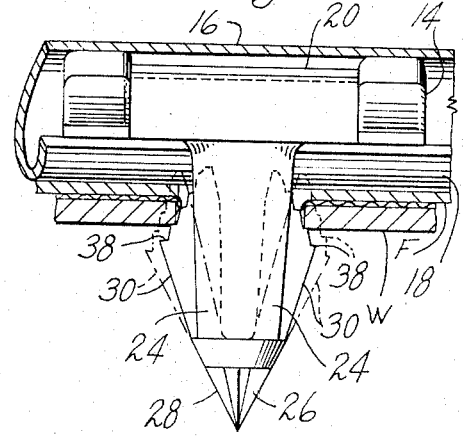
FIG. 6 is a view in side elevation of the fastener in installed position in the assembly of FIG. 5.

Disposed in a general plane between the stem portions 24,24 is a pair of opposed side wings 30,30. The wings 30 extend toward the base 14 from the penetrating portion 26, their portions nearer the base being yieldable inwardly. As shown in FIGS. 2 and 3, each wing 30 emerges from the portion 26 in a triangular shape and having uniform thickness less than the spacing between the stem portions 24. A leading edge surface 32 of each wing is preferably disposed at a larger angle with respect of the axis of symmetry of the fastener than a trailing or locking shoulder 34. The arrangement accordingly is such that as stem portions 24,24 are thrust through a hole 36 in a work piece W (FIG. 4) on which the molding strip 16 is to be mounted as illustrated in FIG. 5, the lead surfaces 32 are cammed inwardly by a wall of the hole 36 until the vertices formed by the edges 32 and the shoulders 34 pass beyond the work piece, whereupon the shoulders 34, which desirably are formed with biased teeth 38, resiliently spring apart to cause the teeth to lock on the work W.

It will be appreciated that the locking shoulders 34 of the clip 12 enable the molding strip 16 to be easily assembled on a stiff backing or perforate plate such as the work piece W and, if desired, to thereby hold in clamping relation other sheet material such as cardboard or fabric F (prepunctured or imperforated) secured to a welt or strip of decorative molding M (FIGS. 4, 5) as sometimes employed for vehicle interior trim. The shoulder teeth 38, being graded in their spacing from the legs of the base 14, serve to automatically compensate for variations in size of the holes 36, non-linearity or yield in the molding 16, ranges of thickness in the work plate W and/or the fabric F, or small irregularity in the clips themselves. Hence problems in assembly are minimized. The wings 30 will provide good holding power causing the legs of the base 14 to bear on the molding portions 18 whereby they clamp effectively on the sheet material F to hold it outspread, and no sharp or hard edges are exposed.

Referring now to FIGS. 7-9 inclusive, an alternative embodiment of the invention generally designated 50 is shown wherein, as distinguished from the clip 12, the longitudinal accommodation does not derive entirely from locking shoulders, but is provided at least in part by its base 52. For purposes of illustration, the clip 50 is adapted for use in vehicle door trim which comprises, as shown in FIGS. 10 and 11, a length of molding 54, a rigid backing member in the form of a channel 56, and decorative flexible lining 58. The base 52 is rectangular and formed with a lengthwise slot 60. The longer sides of the base 52 are slidably received on internal, longitudinal shelves or guideways 62,62 formed within the molding, oppositely extending tabs 64,64 projecting resiliently from the shorter sides of the base 52. The tabs 64 are, when unstressed, inclined upwardly out of the general plane of the base 52 and hence yieldably bear on an internal rib 66 of the molding 54 to firmly seat the base 52 on the guideways 62.

The stem, wing and point portions of the symmetrical one-piece clip 50 are substantially as disclosed in the clip 12 and correspondingly bear like reference characters except that no retaining teeth need be formed on the shoulders 34. In this case the clip 50 is initially assembled in the molding 54, and usually spaced lengthwise from other clips 50 mounted therein, and then the assemblage as shown in FIG. 11 is thrust against the channel 56, the wings 30 being cammed together by the wall of a suitable hole 68 (FIG. 11) in the channel. The lining 58, if not punctured, will be pierced by the clip point 26 as the stem portions 24 are projected through the hole 68. The collapsed locking shoulders 34 radially expand after the widest portion across the wings 30 has passed through the hole and thereby clamp the lining 58 and the channel 56 against the undersides of the guideways 62. The stem portion of the clip 50 is thereby maintained in tension against the resilience of the tabs 64.

The illustrated clips 12 and 50, and other forms of the invention not herein specifically described are easily and quickly installed. They inherently provide good adaptability for securing moldings and/or other articles. It will be appreciated that disassembly of the work pieces is more readily attained when the clips 50 are employed, since movement together of toothed locking shoulders 34 may be resisted more than would a pinching together of the plain locking shoulders 34.

Having thus described my invention, what I claim as new and desire to secure by Letters Patent of the United States is:

1. A one-piece fastener comprising a base portion, a partly forked, tapering system extending along an axis substantially at right angles to the base portion and terminating in a pointed portion, the forked portions of the stem projecting from opposite sides of an aperture in said base portion and merging to provide said pointed portion with a solid work-puncturing tip, at least two opposed, sharp longitudinal ridges tapering symmetrically on said pointed portion with respect to said axis to converge at said tip, and opposite side wings spaced from and extending toward the base portion from the pointed portion, the wings being resiliently deflectible towards each other and respectively having a locking shoulder portion inclined inwardly as it approaches the base portion.

2. The fastener of claim 1 molded in symmetrical form relative to a longitudinal axis, the wings being adapted to at least partly extend in and be deflectible in space defined by the forked stem.

3. The fastener of claim 1 wherein each of the side wings is generally triangular, a leading edge surface of each wing being disposed in continuation of one of said ridges and at a greater angle to said axis than the locking shoulder portion.

4. The fastener of claim 1 wherein the base portion includes oppositely projecting, resilient mounting tabs, the tabs when unstressed extending away from the side wings and in their general plane.

5. The combination with a molding strip, a flexible lining, and a mounting member of a one-piece clip for holding them in assembled relation, said clip comprising a base portion slidably receivable within the molding strip and adapted to bridge spaced shelf portions thereof, semi-cylindrical, generally tapering stem portions projecting from the base portion in substantially parallel relation and merging at a terminal pointed conical portion, said conical portion being defined by radially tapering sharp ridges adapted to slit said lining on penetration of said pointed portion, opposed side wing portions resiliently extending outwardly from the stem portions, respectively, and partly disposed therebetween, said wing portions having leading edge surfaces merging with the pointed conical portion and trailing locking shoulders, the locking shoulders being spaced from the base portion to hold the molding strip, lining, and mounting member in clamped relation when said wings are thrust through an aperture in the member having a wall adapted to cam the wings together.

6. The combination of claim 5 wherein the base portion of the clip is formed with opposed resilient tabs engageable with the molding strip and, when unstressed, extend in the general plane of said wings and away therefrom.

7. The combination of claim 5 wherein the said terminal portion is comprised of four equi-angularly spaced merging ridges for facilitating hole forming, two of said ridges lying in the plane of said opposed side wing portions.

* * * * *

PO-1050
(5/69)

UNITED STATES PATENT OFFICE
CERTIFICATE OF CORRECTION

Patent No. 3,775,927　　　　　　　　Dated December 4, 1973

Inventor(s) Engelbert A. Meyer

It is certified that error appears in the above-identified patent and that said Letters Patent are hereby corrected as shown below:

In the claims:

Claim 1, Column 4, line 3, after tapering and before extending, change system to --stem--

Claim 2, Column 4, line 20, after deflectible and before space, change in to --into--

Signed and sealed this 9th day of April 1974.

(SEAL)
Attest:

EDWARD M. FLETCHER, JR.　　　　　　　　C. MARSHALL DANN
Attesting Officer　　　　　　　　　　　　Commissioner of Patents